US 6,520,601 B1

(12) United States Patent
Kahl et al.

(10) Patent No.: US 6,520,601 B1
(45) Date of Patent: Feb. 18, 2003

(54) METHOD AND DEVICE FOR BRAKE PRESSURE ADJUSTMENT

(75) Inventors: Harald Kahl, Limburg (DE); Bernd-Uwe Hartmann, Gründau (DE)

(73) Assignee: Continential Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/701,789

(22) PCT Filed: May 12, 1999

(86) PCT No.: PCT/EP99/03279

§ 371 (c)(1),
(2), (4) Date: Mar. 2, 2001

(87) PCT Pub. No.: WO99/64282

PCT Pub. Date: Dec. 16, 1999

(30) Foreign Application Priority Data

Jun. 5, 1998 (DE) .......................................... 198 25 273
Aug. 13, 1998 (DE) .......................................... 198 36 686

(51) Int. Cl.[7] ............................................... B60T 8/66
(52) U.S. Cl. ................ 303/167; 303/155; 303/DIG. 4; 303/113.2; 701/78
(58) Field of Search ............................. 303/113.2, 167, 303/DIG. 4, 139, 154, 155, DIG. 3, 166; 701/74, 78, 83, 71; 180/197

(56) References Cited

U.S. PATENT DOCUMENTS

| 4,930,845 A | * | 6/1990 | Bleckmann et al. | ........ 303/139 |
| 5,058,699 A | * | 10/1991 | Fennel et al. | ................ 180/197 |
| 5,116,108 A | * | 5/1992 | Sigl et al. | .................... 303/139 |
| 5,207,484 A | * | 5/1993 | Bleckmann et al. | ........ 303/167 |
| 5,293,315 A | * | 3/1994 | Kolbe et al. | ................. 303/139 |
| 5,419,622 A | * | 5/1995 | Burg et al. | .................. 303/139 |
| 5,560,688 A | * | 10/1996 | Schappler et al. | ............. 303/3 |
| 5,577,812 A | * | 11/1996 | Hirano et al. | ............... 303/112 |
| 6,076,900 A | * | 6/2000 | Jung et al. | ................... 303/156 |

FOREIGN PATENT DOCUMENTS

| DE | 38 01 321 | 7/1989 |
| DE | 38 09 100 | 9/1989 |
| DE | 39 28 649 | 3/1991 |
| DE | 44 06 235 | 8/1995 |
| DE | 196 09 869 | 9/1996 |
| DE | 196 51 154 | 6/1997 |
| DE | 197 23 255 | 12/1997 |
| DE | 196 40 743 | 4/1998 |
| DE | 197 12 889 | 10/1998 |

* cited by examiner

Primary Examiner—Jack Lavinder
Assistant Examiner—Mariano Sy
(74) Attorney, Agent, or Firm—Rader, Fishman & Grauer PLLC

(57) ABSTRACT

The present invention discloses a method for brake pressure adjustment of a wheel brake comprising the following steps: determining a preliminary nominal pressure gradient in a brake control, determining actuating signals for a hydraulic pump and/or at least one hydraulic valve for the adjustment of the nominal pressure gradient, determining the actual pressure by way of a pressure model, determining the slip of a driven wheel, comparing the actual pressure with a first threshold value that is lower than the maximum possible brake pressure, and comparing the wheel slip, if the wheel slip is a traction slip, with a second threshold value, wherein, if the actual pressure and the wheel slip exceed the respective threshold values, the preliminary nominal pressure gradient is raised. The present invention also relates to a corresponding device.

22 Claims, 3 Drawing Sheets

METHOD AND DEVICE FOR BRAKE PRESSURE ADJUSTMENT

TECHNICAL FIELD

The present invention generally relates to vehicle brakes and more particularly relates to a method and a device for brake pressure adjustment of a hydraulic wheel brake.

BACKGROUND OF THE INVENTION

In modern brake systems of vehicles, especially automotive vehicles, the brake pressures on the respective wheel brakes are controlled according to different parameters. A primary control circuit has control objectives such as optimization of deceleration, steering optimization, or stability optimization in an actual braking operation. To this end, the wheel brakes are activated according to different criteria or operating sequences, especially by determination of a defined nominal pressure in the brakes. This nominal pressure is adjusted in a secondary control. The secondary control, hence, receives the nominal pressure as an input quantity and produces actuating signals for valves, if necessary, brake force boosters or a hydraulic pump to adjust the nominal pressure. Among others, the actual pressure for the respective wheel brake is determined in order to produce therefrom, along with the nominal pressure, the deviation, with a view to taking further appropriate measures.

Therefore, brake pressure is not measured by sensor means in modern brake systems but is determined by way of a model. This is advantageous because it obviates the need for sensors and corresponding wiring structure.

The pressure model receives required input quantities and determines from these quantities, as well as according to system parameters, the actual pressure that prevails in the respective brake. More particularly, the pressure model can receive the control signals which influence the brake pressure on the brake under review, i.e., for example, signals for supply valves, discharge valves, for a hydraulic pump, or similar components. From these signals and from system parameters (for example, line cross-sections, viscosity of the hydraulic fluid, switching characteristics, etc.), the model can determine the actual pressure in parallel to the development of the pressure in the respective wheel brake so that the secondary control circuit may be closed by output of the actual pressure which is thus determined by way of the model.

One difficulty of existing systems is to take into consideration the influence of varying temperatures. The viscosity of the hydraulic fluid, usually hydraulic oil, declines at low temperatures. Principally, this influence can be recognized by further sensors. However, if it is desired to manage without additional sensors in this case, too, other strategies may be chosen. One strategy includes testing the value of the actual pressure determined by the pressure model with respect to a maximum system pressure. This is based on the following reflection: due to the increased viscosity of the (still cold) hydraulic oil, the existing pressure will lag behind the actual pressure determined by way of the model. This leads to the fact that the actual pressure determined by the model finally exceeds system limits which are not used in practical operations. It is detected in a like situation that the hydraulic fluid is still cold. This statement is taken into account in control strategies in an appropriate manner.

One shortcoming of this method is that much time passes by until the possibly critical condition is detected. This is shown by way of FIG. 3 where different pressure increase curves plotted against time are shown. Curve 320 is a curve which shows the pressure increase when the fluid is warm. Where the objective is to build up a brake pressure Psoll, it will build up along curve 320 with warm fluid and reaches the value Psoll at time $t_0$. If, however, the hydraulic fluid is (still) cold, the increase takes its course along curve 310 due to the lower viscosity, and the value Psoll is reached only at time $t_1$. Both curves 310 and 320 can rise qualitatively corresponding to an exponential function with a negative exponent because the further pressure increase depends on the difference in pressure between the pressure source and the system. In both cases, the end value would be the maximum possible system pressure as it can be produced, for example, by the hydraulic pump or the brake force booster. The brake pressure Pp corresponds to the maximum attainable brake pressure. The latter is generally not reached, alone because the brake system includes safety valves which open beforehand, for example, at the limit pressure Pg'. Therefore, the pressure in the brake system will not rise in excess of this value. The pressure Pg' was used as a criterion for the poll, with the result of a slow identification.

The above disadvantage shows especially in modern traction slip control systems. In these systems, traction slip is frequently adjusted to desired values by way of brake intervention. Consequently, drive and brake operate in opposition to each other. This may become important, for example, in difficult driving maneuvers such as starting to drive on different coefficients of friction per vehicle side, especially when driving uphill. The wheels on one side can assume a high coefficient of friction and, hence, have a more or less normal grip, while the other wheels adopt a low coefficient of friction (snow or ice) so that they may a priori spin, with the result of positive slip being caused (wheel speed is quicker than vehicle speed). In the extreme case, no drive torque can be supplied to the vehicle because the entire propulsive power is conducted by way of the differential into the spinning wheel, and the wheel which has grip is not driven. Brake intervention at the spinning wheel causes a drive torque with which the vehicle can be furnished by way of the gripping wheel. This should be done as early as possible in order that the vehicle can be provided with a drive torque as early as possible. When time is lost then, this may have adverse effects, for example, that the vehicle rolls backwards, or that the engine and the brake operate in opposition to one another for an unnecessarily long time. On the other hand, a high amount of traction slip may be desirable to produce a supporting moment on the low coefficient-of-friction side.

An object of the present invention is to provide traction slip control which quickly identifies a wrong adaption of a pressure model without additional sensors.

Figure 1:
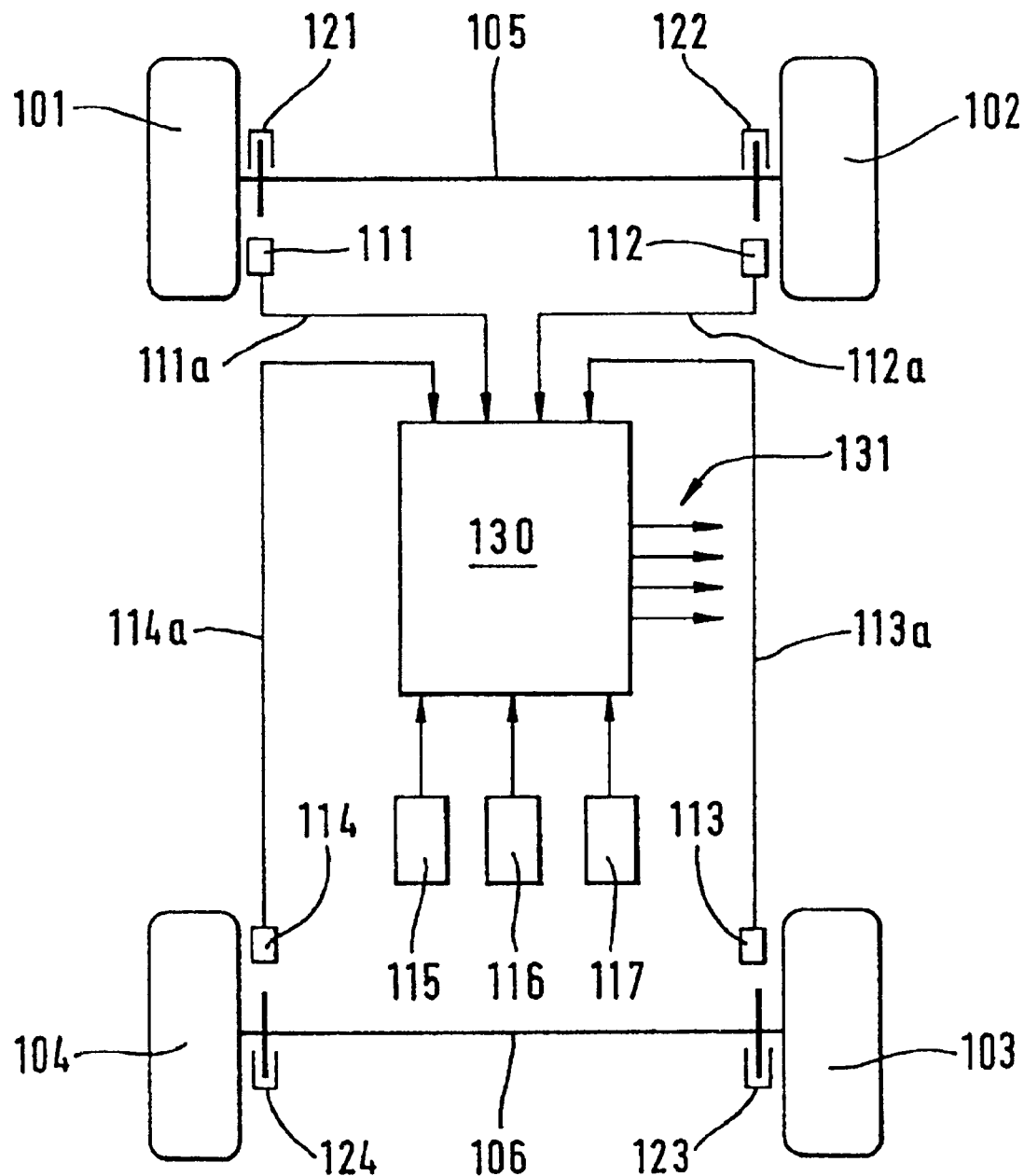
FIG. 1 is a schematic view of a vehicle in which the present invention can be implemented.
Figure 2:
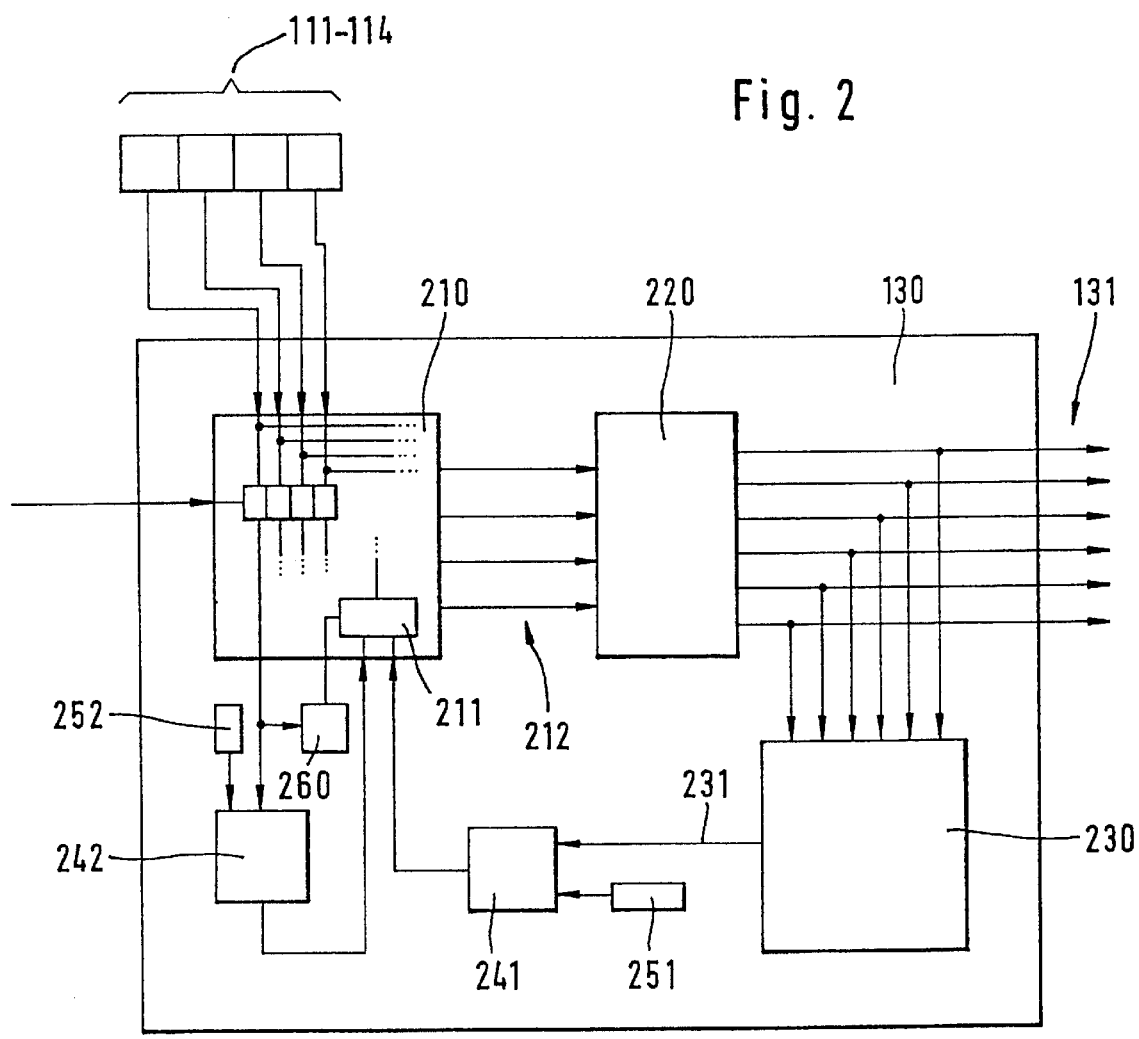
FIG. 2 shows a device according to the present invention. Like reference numerals as in FIG. 1 refer to like components.

Reference numerals 101 to 104 show wheels of the vehicle, namely, 101 is the left front wheel, 102 is front right, 103 is the rear right wheel, and 104 is the left rear wheel. Reference numeral 105 refers to the front axle, 106 to the rear axle. Wheel brakes 121, 122, 123, 124 are provided on the wheels. Further, each wheel has a wheel sensor (111 to 114) sending signals to a control unit 130 by way of associated lines (111a to 114a). This control unit can also receive input signals of further sensors or components 115 to 117 and produces output signals 131 for activating the wheel brakes 121 to 124 and, if necessary, further components (not shown) such as engine interface, or similar components. The latter interface may also be used to influence the drive torque.

DETAILED DESCRIPTION OF THE PREFERRED EMBODIMENTS

The control unit 130 includes a control component 210 that performs a conventional control, for example, brake slip or traction slip control. It receives input signals, especially the signals 111a to 114a from the wheel sensors 111 to 114, as well as further signals, for example, the vehicle reference speed, or similar values. According to these values, and by taking into account control strategies that are not referred to in detail, the control unit produces output signals 212, which among others, represent a nominal value for the pressure gradient for at least one driven wheel. A first discovering device 220 produces therefrom actuating signals 131 for corresponding valves of the hydraulic brake in order to either increase or decrease the brake pressure. In addition, actuating signals for a hydraulic pump and, if necessary, also for the engine interface may be produced.

A second discovering device 230 determines the actual pressure. The second discovering device 230 is a pressure model which receives appropriate input quantities, i.e., signals 131 in the embodiment shown, that is, the signals used for brake pressure control. The brake pressure model 230 calculates the actual pressure from these signals and issues it as signal 231.

What is only shown herein is the signal path of a driven wheel. The calculation may be effected in the same fashion for the pressures of all wheel brakes. The actual pressure of a wheel brake is compared to a nominal value (from device 251) in a first comparing device 241. In a second comparing device 242, the traction slip of preferably the same wheel is compared with a threshold value from device 252. The slip threshold value of device 252 is comparatively high and may be in excess of 40 or 50 km/h, for example.

When a high traction slip (in comparator 242) and a high actual pressure in the brake system (in comparator 242) is detected, a changing device 211 is activated which subsequently raises the nominal brake pressure gradient in particular. A quicker rise in the pressure is effected by increasing the nominal pressure gradient so that the above-mentioned disadvantageous situation is terminated quickly. In particular, it is terminated quickly when the first comparing device 241 compares the actual pressure of device 230 with a lower value rather than with the maximum possible system pressure. Because comparatively low brake pressures are sufficient already to achieve a remarkable deceleration in traction slip control operations, on the other hand, a brake pressure which, admittedly, has considerable values but lies remarkably below the maximum system brake pressure is an indicator that the model of the second discovering device 230 is not in conformity with reality so that a pressure which is lower than the maximum pressure may be used to identify the situation.

By taking a value from device 251 as a threshold value which is below the maximum possible system pressure Pg', the velocity of response of the method of the present invention or the device of the present invention is raised because not much time will pass until the model 230 has calculated the maximum possible system pressure Pg' at time tg'. The limit value Pg, at time $t_g$, rather is reached much earlier so that suitable countermeasures may also be taken earlier. The saving of time is higher than the ratio between Pg' and Pg in percent because the first value is in the flat portion of the pressure increase curve 310 or 320 and, therefore, requires an overproportional length of time to be reached. The limit value Pg lies below the maximum possible system pressure and preferably amounts to less than 70% of the maximum possible brake pressure, further, preferably less than 60% of the maximum possible brake pressure.

The method described or the device described permits quickly recognizing effects of a (still) cold hydraulic fluid. As a countermeasure, the pressure gradient as predetermined as a nominal value by the control component 210 may be increased, for example, by shortening the pauses between the pressure increase pulses, or by extending or increasing the pressure increase pulses themselves. Although the pressure increase gradient which actually develops will still not correspond to the nominal value predetermined by control component 210, it will become higher after all so that it approaches at least the previously desired nominal value. The secondary brake pressure (gradient) control will then lose its capacity of being a closed control circuit and becomes an actuation control.

Figure 3:
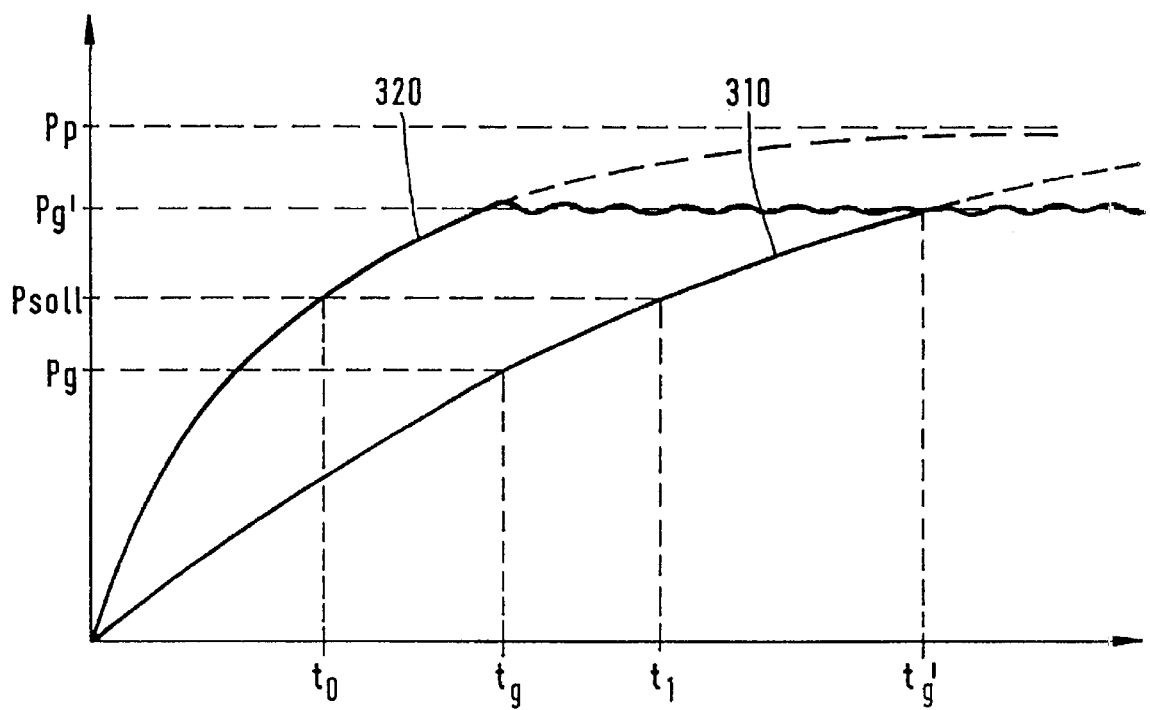
FIG. 3 is a graph depicting the shortcoming of the prior art method.

The first threshold value (in FIG. 3 $P_g$) may be variable and determinable by a first determining device 251. The determination may be effected according to operating conditions of the vehicle and/or according to internal signals of the control unit 130. The same applies to the extent of the variation of the pressure gradient by the changing device 211. The second threshold value can be or become determined in a second determining device 252. The determination may be effected in dependence on vehicle parameters, operating conditions of the vehicle, or internal signals. The threshold values may also be fixed values. In this event, the determining devices 251, 252 would have the function of registers.

The change in the brake pressure gradient may be reset when one of the comparing devices 241, 242 finds out that values drop below the threshold value it monitors in each case. On the other hand, it has been found that this may be too late as a termination criterion because excessive brake interventions will occur for a long time. Therefore, it may be another termination criterion to monitor the slip gradient. A slip gradient discovering device 260 may be provided for this purpose. Device 260 monitors the time variation of the wheel slip on the driven axle under review. In case the gradient is negative (because the slip has exceeded its maximum and starts to drop due to the brake pressure developing more quickly), another change in the brake pressure gradient may be carried out, for example, to the end that it is set to the original value or an intermediate value.

The second discovering device 230, i.e., the pressure model, may be a computer which calculates the actual pressure (represented by line 231) according to the input signals received. Solutions such as characteristic fields are possible just as well so that the calculating operation may be replaced by an addressing operation according to the input quantities received. A quantity stored in the characteristic field appears as an output value. The characteristics of the brake system such as line cross-sections, supply pressures, etc., are taken into account in the formulas or in the values stored in the tables of the characteristic field.

The change in the brake pressure gradient by the changing device 211 may also be effected in view of the vibration behavior of the vehicle. Especially, the change may take place in steps or in such a manner that only defined abrupt changes of the brake pressure gradient are allowed.

Because the method described or the device described is intended to take effect in particular in driving situations at low speeds, especially when starting to drive, further provisions may be made to also take into account the vehicle speed. For example, the method may be discontinued or prevented once the vehicle speed exceeds a vehicle limit speed. The limit value may amount to 20 or 10 km/h.

What is claimed is:

1. Method for brake pressure adjustment of a wheel brake in a brake system of a vehicle, the method comprising the steps of:
   determining a nominal pressure gradient,
   determining actuating signals for one of a hydraulic pump and at least one hydraulic valve for adjusting the nominal pressure gradient,
   determining an actual brake pressure of a driven wheel,
   determining a wheel slip of the driven wheel,
   comparing the actual brake pressure with a first threshold value that is lower than a maximum possible brake pressure, and
   comparing the wheel slip, if said wheel slip is a traction slip, with a second threshold value,
   wherein the nominal pressure gradient is increased when the actual brake pressure and the wheel slip exceed the first and second threshold values, respectively wherein the actual pressure is determined according to a pressure model.

2. Method as claimed in claim 1, wherein the first threshold value is determined according to operating conditions of the vehicle.

3. Method as claimed in claim 2, wherein the first threshold value is less than 60 percent of the maximum possible brake pressure.

4. Method as claimed in claim 2, wherein one of the first threshold value and the second threshold value is determined according to one of an engine power, an axle load distribution, a vehicle weight and a design of the brake system.

5. Method as claimed in claim 1, wherein the nominal pressure gradient is increased until one of the actual brake pressure and the slip of the driven wheel drop below one of the first and second threshold values.

6. Method as claimed in claim 1, wherein the nominal pressure gradientis increased until a slip acceleration is negative.

7. Method as claimed in claim 1, wherein the nominal pressure gradient is increased according to a vibration behavior of the vehicle.

8. Method as claimed in claim 1, wherein the nominal pressure gradient is increased by one of shortening pulses between pressure increase pulses and by increasing a length of time of each pressure increase pulse.

9. Method as claimed in claim 1, wherein the nominal pressure gradient is determined in a primary control according to a running behavior of one or more wheels and is adjusted in a secondary control according to the actual pressure.

10. Method as claimed in claim 1, wherein the second threshold value is greater than 50 km/h.

11. Method as claimed in claim 1, wherein the nominal brake pressure gradient is not increased when a vehicle speed exceeds a vehicle limit speed.

12. Method as claimed in claim 1, wherein the nominal brake pressure gradient is increased as part of a traction slip control method.

13. Device for brake pressure adjustment of a wheel brake in a brake system of a vehicle, comprising:
   a control component for determining a nominal pressure gradient of a hydraulic brake according to input signals received,
   a first discovering device for determining actuating signals for one of a hydraulic pump and at least one hydraulic valve for adjusting the nominal pressure gradient,
   a second discovering device for determining an actual brake pressure,
   wheel sensors for determining a running behavior of a driven wheel, and for determining a wheel slip of the driven wheel,
   a first comparing device for comparing the actual brake pressure from the second discovering device with a first threshold value that is lower than a maximum possible brake pressure,
   a second comparing device for comparing the wheel slip, if said wheel slip is a traction slip, with a second threshold value, and
   a changing device for increasing the nominal pressure gradient when the actual brake pressure and the wheel slip exceed the first and second threshold values, respectively a primary brake control which acts according, to a running behavior of one or more wheels,
   and a secondary control for adjusting the nominal pressure gradient according to the actual brake pressure wherein the second discovering device receives output values of the first discovering device and determines the actual brake pressure from the said output values and according to parameters of the brake system by way of a pressure model.

14. Device as claimed in claim 13, further including a first determining device for determining the first threshold value according to operating conditions of the vehicle.

15. Device as claimed in claim 14, wherein the first determining device determines the first threshold value to be lower than 60 percent of the maximum possible brake pressure.

16. Device as claimed in claim 14, wherein one of the first threshold value and the second threshold value is determined according to one of an engine power, an axle load distribution, a vehicle weight, and a design of the brake system.

17. Device as claimed in claim 13, wherein the nominal pressure gradientis increased until one of the actual brake pressure and the slip of the driven wheel drop below one of the first and second threshold values.

18. Device as claimed in claim 13, further including a slip acceleration determining device that acts upon the changing device.

19. Device as claimed in claim 13, wherein t he changing device increases the nominal brake pressure gradient by one of shortening pulses between pressure increase pulses and increasing a length of time of each pressure increase pulse.

20. Device as claimed in claim 13, wherein the device is part of a traction slip control system.

21. Method for brake pressure adjustment of a wheel brake in a brake system of a vehicle, the method comprising the steps of:
   determining a nominal pressure gradient,
   determining actuating signals for one of a hydraulic pump and at least one hydraulic valve for adjusting the nominal pressure gradient, determining an actual brake pressure of a driven wheel, determining a wheel slip of the driven wheel, comparing the actual brake pressure with a first threshold value that is lower than a maximum possible brake pressure, and comparing the wheel slip, if said wheel slip is a traction slip, with a second threshold value, wherein the nominal pressure gradient is increased when the actual brake pressure and the wheel slip exceed the first and second threshold values, respectively wherein the second threshold value is greater than 50 km/h.

22. Method for brake pressure adjustment of a wheel brake in a brake system of a vehicle, the method comprising the steps of:

determining a nominal pressure gradient, determining actuating signals for one of a hydraulic pump and at least one hydraulic valve for adjusting the nominal pressure gradient, determining an actual brake pressure of a driven wheel, determining a wheel slip of the driven wheel, comparing the actual brake pressure with a first threshold value that is lower than a maximum possible brake pressure, and comparing the wheel slip, if said wheel slip is a traction slip, with a second threshold value, wherein the nominal pressure gradient is increased when the actual brake pressure and the wheel slip exceed the first and second threshold values, respectively wherein the nominal brake pressure gradient is not increased when a vehicle speed exceeds a vehicle limit speed.

* * * * *

UNITED STATES PATENT AND TRADEMARK OFFICE
CERTIFICATE OF CORRECTION

PATENT NO.   : 6,520,601 B1  Page 1 of 1
DATED        : February 18, 2003
INVENTOR(S)  : Harald Kahl and Bernd-Uwe Hartmann It is certified that error appears in the above-identified patent and that said Letters Patent is hereby corrected as shown below:

Column 5,
Line 46, change "pressure gradientis increased" to -- pressure gradient is increased --.

Column 6,
Line 27, change "according, to a running" to -- according to a running --.
Line 49, change "pressure gradientis increased" to -- pressure gradient is increased --.

Signed and Sealed this

Eighth Day of July, 2003

JAMES E. ROGAN
*Director of the United States Patent and Trademark Office*